(12) United States Patent
Charania et al.

(10) Patent No.: US 7,116,771 B2
(45) Date of Patent: Oct. 3, 2006

(54) METHOD FOR GENERALIZATION OF TELEPHONE SIGNALING REQUIREMENTS TO SUPPORT MULTIPLE INTERNATIONAL MARKETPLACES IN A SINGLE CUSTOMER PREMISES DEVICE

(75) Inventors: Haneef B. Charania, Skokie, IL (US); Richard Vetter, Upper Darby, PA (US); Robert Litwak, Churchville, PA (US)

(73) Assignee: General Instrument Corporation, Horsham, PA (US)

( * ) Notice: Subject to any disclaimer, the term of this patent is extended or adjusted under 35 U.S.C. 154(b) by 741 days.

(21) Appl. No.: 10/382,486

(22) Filed: Mar. 6, 2003

(65) Prior Publication Data

US 2003/0223432 A1   Dec. 4, 2003

Related U.S. Application Data

(60) Provisional application No. 60/362,124, filed on Mar. 6, 2002.

(51) Int. Cl.
*H04M 3/42* (2006.01)
(52) U.S. Cl. ................................ 379/201.12
(58) Field of Classification Search ............. None
See application file for complete search history.

(56) References Cited

U.S. PATENT DOCUMENTS

| | | | |
|---|---|---|---|
| 3,763,321 A | 10/1973 | Bergquist et al. | 179/18 |
| 4,803,718 A | 2/1989 | Neil et al. | 379/163 |
| 4,841,561 A | 6/1989 | Hill | 379/97 |
| 5,495,522 A | 2/1996 | Allen et al. | 379/202 |
| 5,509,054 A | 4/1996 | Garland | 379/106 |
| 5,606,597 A | 2/1997 | Newland | 379/61 |
| 5,712,977 A | 1/1998 | Glad et al. | 395/200.09 |
| 5,717,692 A | 2/1998 | Blackwell | 370/463 |
| 5,883,893 A | 3/1999 | Rumer et al. | 370/395 |
| 5,940,479 A | 8/1999 | Guy et al. | 379/93.01 |
| 6,141,339 A * | 10/2000 | Kaplan et al. | 370/395.61 |
| 6,259,691 B1 | 7/2001 | Naudus | 370/352 |
| 6,304,642 B1 | 10/2001 | Beamish et al. | 379/142.01 |
| 7,016,338 B1 * | 3/2006 | Gunn et al. | 370/352 |
| 2004/0114745 A1 * | 6/2004 | Koch | 379/201.12 |

* cited by examiner

*Primary Examiner*—Creighton Smith
(74) *Attorney, Agent, or Firm*—Lawrence T. Cullen

(57) ABSTRACT

A method for operating a telephony device accounts for variations in international standards for certain telephony operations, including hook flash functionality, pulse dialing operations, tone dialing operations, jitter buffer size, debounce characteristics, transmitter and receiver gain, caller identification functionality, pulse signaling operations, and ringing operations. The method includes defining each of the plurality of values as a management information base object; receiving a plurality of downloadable values downloaded to the telephony device over an Internet Protocol network as a management information base table; storing the plurality of downloadable values in a memory in the telephony device; and using the stored plurality of downloadable values to control operations of the telephony device, including hook flash functionality, pulse dialing operations, tone dialing operations, jitter buffer size, debounce characteristics, transmitter and receiver gain, caller identification functionality, pulse signaling operations, tone operations, call progress tones (e.g., busy tone, ringback, tone, dial tone, etc.) and ringing operations. Various ranges and default values are established to provide a wide range of operating capability.

109 Claims, 2 Drawing Sheets

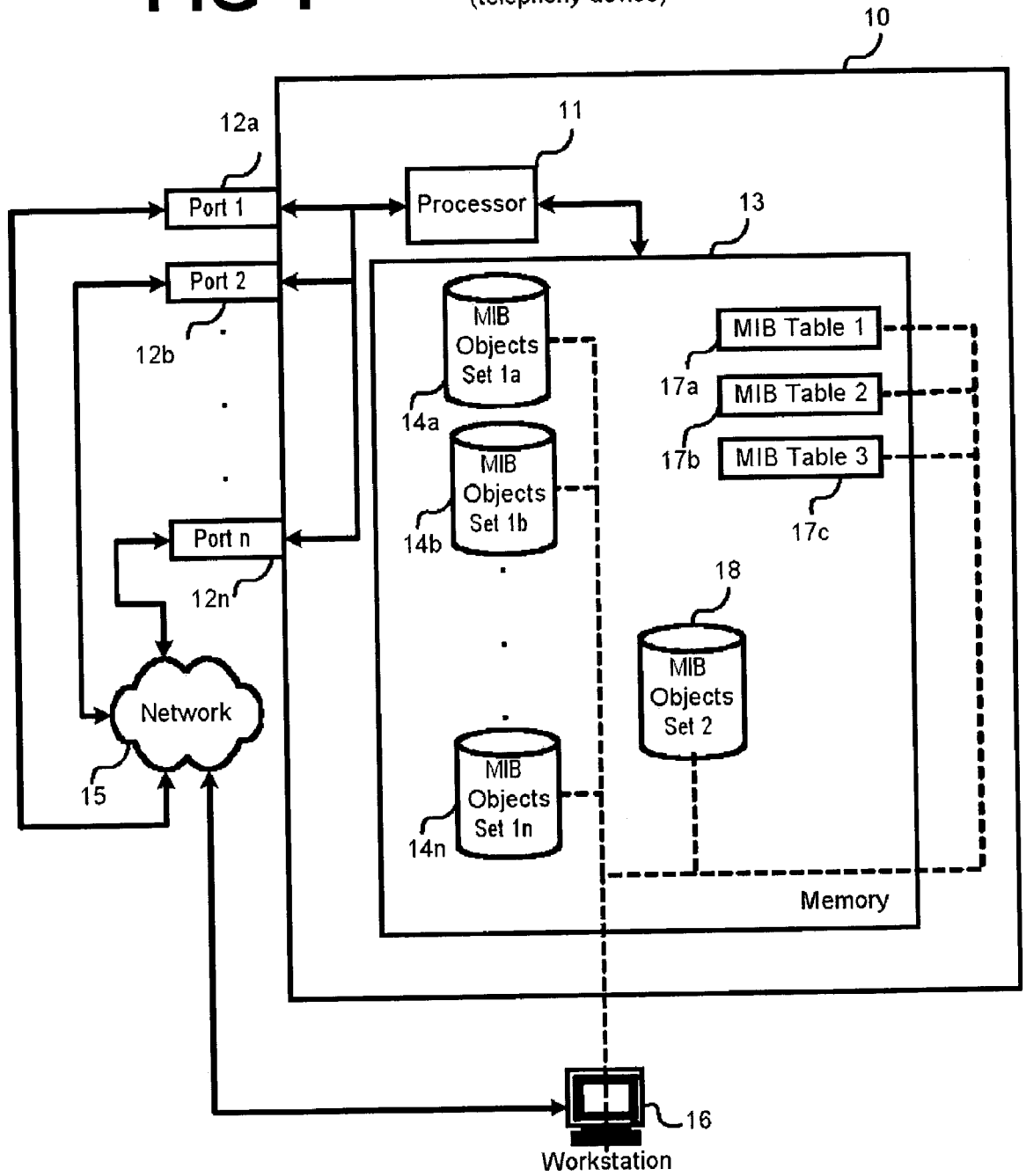

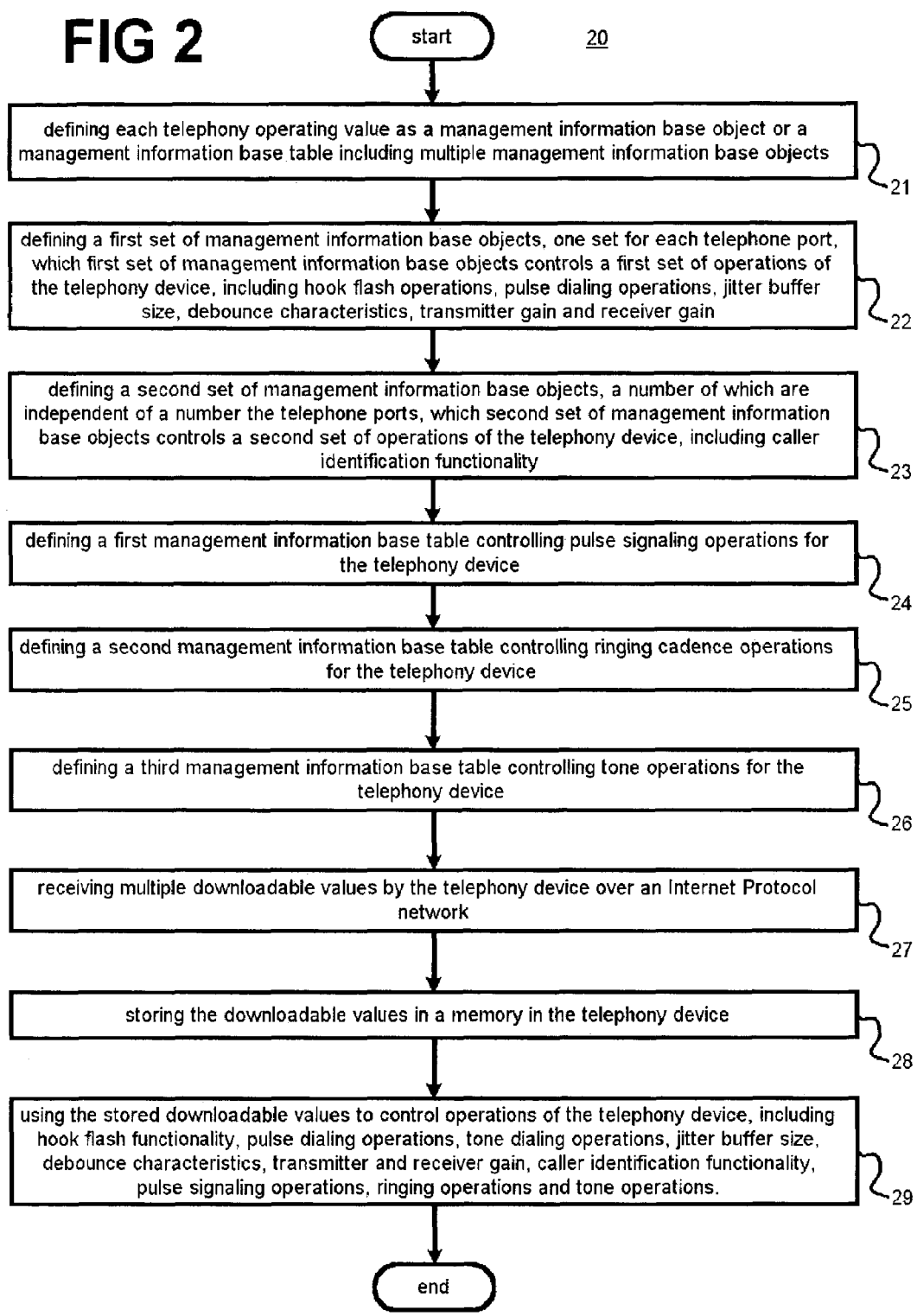

METHOD FOR GENERALIZATION OF TELEPHONE SIGNALING REQUIREMENTS TO SUPPORT MULTIPLE INTERNATIONAL MARKETPLACES IN A SINGLE CUSTOMER PREMISES DEVICE

STATEMENT OF RELATED APPLICATIONS

This application claims the benefit of priority to U.S. Provisional Patent Application 60/362,124, filed Mar. 6, 2002 by the same inventors and with the same title.

This application is also related to U.S. patent application Ser. No. 10/383,172 entitled "System And Method For Adapting Remote Access Telephony Networks To National Deviations" filed concurrently herewith by at least one of the same inventors and assigned to the same assignee, which application is hereby incorporated by reference as if repeated herein in its entirety, including the drawings.

FIELD OF THE INVENTION

The present invention relates generally to method and apparatuses for telephony signaling, and more particularly to a method and apparatus for telephony signaling in large telecommunication networks.

BACKGROUND

In the international telephony marketplace there is historical precedence that varies a number of telephony interface performance parameters across National Boundaries. In the past, products were "nationalized" by either unique hard construction or a combination of hardware and software to adapt to the national deviations. Recent European Union (EU) attempts to "harmonize" these national deviations across the EU have been unsuccessful in achieving complete "harmonization" due to the large base of legacy Telephony Terminal Equipment (TE). Therefore, these national deviations must continue to be accounted for in customer premises equipment. Moreover, the same remains true for the rest of the world.

Yet, manufacturers and telephony operators desire telephony access networks to be capable of adapting to these national deviations without hardware differences in order to reduce terminal equipment compatibility problems, cost and support requirements.

In particular, as it relates to Internet Protocol (IP) based networks, a standards body known as CableLabs was tasked with developing standards for voice-over-IP networks to operate in North America. PacketCable is a communications and signaling standard developed by CableLabs to provide telephony services over a DOCSIS cable modem. DOCSIS stands for Data Over Cable Systems Interface Specifications, which is the CableLabs standard that cable modems use to communicate with the headend and the data network. The ensuing standards developed by Cablelabs/Packetcable provide limited configuration and provisioning capability along with Network Call Signaling (NCS) messages to modify the operation of access devices (called MTAs) based on North American Standards. A Multimedia Terminal Adapter (MTA) is a device that connects to a cable modem to provide telephony service over Hybrid-Fiber-Coax (HFC); an MTA also interfaces with traditional Plain Old Telephone System (POTS) telephones. These standards essentially describe only one profile of possible operation and are not sufficiently flexible to adapt to all of the variations in the international market.

Due to recent interest from multiple International Marketplaces, there is a need to increase the applicability of domestic systems to operate in new and varied environments. To maintain system/product profitability, there is a need to adapt existing system such that it can be configured to operate in these environments so that the same product or products that are employed domestically will operate just as well in foreign countries.

Thus, the present invention is therefore directed to the problem of developing a method and apparatus for enabling domestic telephony equipment to be configurable to operate in foreign countries or in the United States.

SUMMARY OF THE INVENTION

The present invention solves these and other problems by providing a core module, known as an MIB module, in a customer premises device that is a highly flexible platform, which MIB module provides a framework that completely defines the telephony signaling functionality using default values and ranges and selectable parameters, which can then be automatically provided during a provisioning or registration process to configure the customer premises equipment to the applicable national deviations.

According to one aspect of the present invention, relevant parameters are represented in MIB modules such that the widest number of marketplaces may be served by a common system using a smallest set of parameters. In particular, these techniques are applied to Ring Cadences and Call Progress Tones, as well as other aspects of telephony operations.

BRIEF DESCRIPTION OF THE DRAWINGS

FIG. 1 depicts an exemplary embodiment of a telephony device according to one aspect of the present invention.

FIG. 2 depicts an exemplary embodiment of a method for operating a telephony device so that it can meet any national deviations of telephony standards according to another aspect of the present invention.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

One solution to the above-mentioned problem is to develop flexible hardware platforms and then develop methods to configure these flexible platforms per national deviations. Additionally, it is desirable to be able to re-configure these platforms (e.g., during provisioning) at initial installation and system registration to "customize" their operation to specific customer or installation requirements. Finally, some parameters must be changed dynamically on a per call basis to account for Analog Local Access Signaling Services (ALASS) or Custom Local-Area Signaling Services (CLASS), such as distinctive ringing, Caller Line Identification (CLID), meter pulsing, etc., or to improve network bandwidth utilization by changing bandwidth requirements depending on the content requirements of the channel. The following description provides a method for providing the system and methods to adapt platform performance to equipment vendor, service operator and customer needs.

One aspect of the present invention provides a method to translate an ETSI V5.x protocol signaling suite to the Access Network Protocol and to provision the Remote Access node to execute signals and parameters under the control of the protocol. Simple Network Management Protocol (SNMP) can be employed to transfer these parameters to the remote access node. Specific aspects of the invention cover, inter alia, expanded ring cadence variability, pulsed signal requests and steady signal requests unique in the International Marketplace. While all MTAs could be provisioned using SNMP (e.g., using manual SNMP SETS or scripted intervention), an MTA could also be "provisioned" using TFTP to download a configuration file to set the MIB values.

Based on a flexible hardware platform for the Access Node, one aspect of the present invention creates a flexible database (MIB) that establishes "default" performance elements that direct the hardware platform to operate to a default set of elements and parameters (configuration). This initial MIB definition is called the default mode of operation. This "default" set of elements and parameters aligns with the most common set of performance requirements (e.g., EU "harmonized" standards). Essentially, this MIB definition provides a framework that covers all possible national deviations by establishing parameters and ranges for all of the possible variables, and then accepts values that specify completely, as necessary, the specific national deviations.

According to another aspect of the present invention, a "provisioning" process is defined where upon registration on the Telephony Network, the flexible Hardware Platform "Default" MIB is revised (e.g., provisioned) per national or customer requirements. These revisions would result in a change in the performance characteristics of the flexible hardware platform.

According to yet another aspect of the present invention, a set of software instructions is defined that are communicable across the network to direct the flexible hardware platform to execute the MIB defined performance parameters.

According to still another aspect of the present invention, a set of extended software instructions are defined that provide informational elements during a call set up or during an operational call to temporarily change the MIB elements and direct the flexible hardware platform to alter its performance characteristics for that call or call condition.

Turning to FIG. 1, shown therein is a generic telephony device (or a multimedia terminal adapter) 10. A Multimedia Terminal Adapter (MTA) is a device that contains the interface(s) to a physical voice device, a network interface, CODECs, and all signaling and encapsulation functions required for VoIP transport, class feature signaling and QoS signaling. The telephony device 10 includes a processor 11, a memory 13 and multiple ports 12a–12n. Each of these ports is coupled to a local exchange, for example, via a network 15. In turn, a workstation 16 is coupled to the same network 15. The workstation 16 can access the memory of the telephony device 10 using SNMP technology discussed below. The memory includes a set of MIB objects 14a–14n, one for each port, another set of MIB objects 18 that are independent of the number of ports, three MIB tables 17a–c, which include additional MIB objects. A dotted line shows that the workstation can interact with the MIB objects and tables stored in the memory 13, but the actual connections occur via the network 15, and the ports 12a–12n and under control of the processor 11.

Turning to FIG. 2, shown therein is a generic method for operating a telephony device so that it can be adapted to different national standards or deviations. By defining each telephony operating value as a management information base object or a management information base table including multiple management information base objects (element 21), the telephony device can then accept new values for these objects, assuming the new values lie within the defined range of the given variable or object. A first set of management information base objects is defined, one set for each telephone port, which first set of management information base objects controls a first set of operations of the telephony device, including hook flash operations, pulse dialing operations, jitter buffer size, debounce characteristics, transmitter gain and receiver gain (element 22). A second set of management information base objects is also defined, a number of which are independent of a number the telephone ports, which second set of management information base objects controls a second set of operations of the telephony device, including caller identification functionality (element 23). A first management information base table controlling pulse-signaling operations for the telephony device is defined (element 24). A second management information base table controlling ringing cadence operations for the telephony device is also defined (element 25). A third management information base table controlling tone operations for the telephony device is defined (element 26). Multiple downloadable values are received by the telephony device over an Internet Protocol network (element 27). The downloadable values are stored in a memory in the telephony device (element 28), and then the stored downloadable values are used to control operations of the telephony device, including hook flash functionality, pulse dialing operations, tone dialing operations, jitter buffer size, debounce characteristics, transmitter and receiver gain, caller identification functionality, pulse signaling operations, ringing operations and tone operations (element 29).

Telephony Parameters

The following Telephony Parameters may be adapted by the methods described in this application, but the inventions herein are not limited to or bound by these parameters. By using the techniques specified herein, at least each of the following parameters can be completely tailored to any existing national deviations. Moreover, new national deviations not currently specified may be created using the techniques herein given the broad range and flexibility now possible for the following parameters of line signaling:

Telco Line Impedance
Receive audio loss (downstream loss, Digital-to-Analog (D/A) loss, per ITU-T Q.551.Q.552—Lo)
Transmit Audio Loss (upstream loss, Analog-to-Digital (A/D) loss, per ITU-T Q.551/Q.552—Li)
DC Loop Current
DC Loop Voltage (Vbatt)
Loop Polarity/Polarity Reversal
Loop Break Timing—Hook switch, flash hook (Hook flash), dial pulse (pulse dialing)
VoCoder coding law
Supervisory Tone generation
Dual Tone Multi Frequency (DTMF) decoding
DTMF tone encoding
Numbering Plans
On Hook Data Transmission protocol
On Hook Data Transmission tones
Off Hook Data Transmission protocol
Off Hook Data Transmission tones
Ring Signaling (cadence table)
Metering—50 Hz, 12 kHz, 16 kHz
Call Progress Tones "K-break"—timed loop break (disconnect)

While the above list may not be all-inclusive, it is also not required to support all of these features depending on choices made in product design. The methods being described herein provide a method to enable these parameters to be modified if the Access Device is capable of changing its operation.

ETSI ETS 300 001 defines many of these parameters and their national deviations.

Flexible Hardware Platform

An example of a flexible hardware platform includes an Access Device, such as a Cable Modem with an Embedded Media Terminal Adapter, or a Cable Modem with a Media Terminal Adapter. Examples of flexible hardware platforms include the Motorola CG4500/4500E and CG5500/5500E products. The CG4500/5500 Series Communications Gateways are available in two models, which support the DOCSIS and EuroDOCSIS protocols. The CG4500/5500 Communications Gateways support two Plain Old Telephone Service (POTS) lines via two independent, RJ-11 interface jacks. Either telco line may be enabled or disabled remotely and independent of the other line. In addition to supporting telephony services, the Communications Gateways also provide high-speed data links with 10/100 Base T Ethernet and USB data ports. Alternatively, Motorola's SBV4200/SBV4200E (E-MTA) and the VT1000 (Stand alone MTA) can provide the MIB applications and capability herein.

Design technology has progressed to the point where all of the above line signaling parameters may be defined in hardware or in a combination of hardware and software. As the hardware is capable of altering its performance for any one of these parameters or others under software control, the following descriptions apply in the configuring, provisioning and call processing of Analog Telephony.

Parameter Definitions

For each Telephony Performance Parameter, there are several attributes that describe the actual performance characteristic of the Parameter being described. In general, one would consider the format of the database and messages that support the adaptive Telco functionality as:

Parameter: attribute1, attribute2, attribute3, . . . , attributeN

Thus, the database has entries for each of the above parameters and related attributes associated with each of these entries.

Management Information Base (MIB)

The MIB is a collection of managed objects residing in a virtual store, such as a Data Base (DB), which is used to configure or provision the Access Device to perform with the defined parameters as noted above. Usually, this database is centralized and under the control of the system operator. The DB may be structured to allow parameter definition on a system wide, individual device or on a per line basis. The MIB, its management system (e.g., parameter/attribute setting) and method of distributing the contents of the MIB are well known to those familiar in the state of the art, and hence need not be repeated herein.

In general, attributes can be defined based on the nature of the parameter to be adapted.

Parameters that are to be generated by the Access Device will have the following attributes: e.g., amplitude, frequency, duration and cadence timing (e.g., on/off pattern, inter-digit timing, etc.). Other attributes can be specified as well, as necessary.

Parameters that are to be received or detected by the Access Device will have the following attributes: e.g., level, frequency, minimum duration, maximum duration, cadence timing (e.g., on/off pattern, inter-digit timing min/max, etc.). Similarly, other attributes can be specified as well.

Some parameters are value specific, such as for example:
Line Impedance is generally described as a series resistance feeding a parallel combination of a second resistance and a parallel capacitance.
Loop current or Loop Voltage will be specific value parameters.
Loop polarity—Forward loop, Reverse loop
VoCoding Law—G.11 µ-law, G.711 A-law, G.723, G.728, G.729, G.729e, etc.
Dialing Plan—specific digits and digit sequences.

Tolerances are not defined in the system since these are defined by the Access Device hardware and software design characteristics.

Provisioning

The process of configuring and Provisioning Access Devices is well known to those knowledgeable in the state of the art, and hence need not be repeated herein. Expanded parameters and attributes communicated during the provisioning process are described herein.

Network Call Signaling (NCS)

The embodiments described herein utilize NCS messages. Since NCS is a profile of Media Gateway Control Protocol (MGCP) (i.e., the Voice-Over-IP standard adopted by PacketCable) anyone knowledgeable in the art could apply the same messages, principles, and practices with that protocol or any one of a number of other protocols such as Distributed Call Signaling (DCS) or H.323 (an ITU Teleconferencing protocol). As such, the inventions herein are not limited to any one of these protocols.

The CableLabs/PacketCable NCS definition in document Pkt-SP-EC-MGCP-I01-990312 (now PKT-SP-EC-MGCP-I06-021127) only defines a limited capability to control some parameters as defined by Telcordia Telephony documents, such as TA-NWT-000909 and TR-NWT-000057, which have now advanced from technical reports to General Requirements (GR), i.e., GR-57-CORE and GR-909-CORE. To enhance Access Networks to adapt to the wide range of national deviations and some unique parameters in the international market, the original NCS work is expanded as described herein. Thus, a new line package is defined for NCS (e.g., an ETSI line package) to handle the national deviations without conflicting with the original PacketCable NCS Line Package specification.

These messages direct the access device to set parameter values or conditions. In some messages, the values are implied (not stated) so that the provisional values are used. In other cases, the messages are expanded to supply alternate attributes to be used and to supersede the provisional values. Thus, to modify an access device to configure a given line signaling parameter, a message is sent to the access device (e.g., from a system operator node, or under control of a system operator), which message completely adjusts the given line signaling parameter in accordance with the attributes specified in the message. The end result is that the access device now operates according to the specified functionality.

MIB Embodiments

The embodiments described herein are applicable to Broadband Communication Sector (BCS)/Internet Protocol Network Systems (IPNS—now Digital Core Gateways)

Cable Telephone System's customer premises equipment (e.g., a Motorola CG4500/CG4500E, CG5500/CG5500E) along with related element management subsystems (EMSs) and configuration control headend equipment (e.g., Trivial File Transport Protocol (TFTP) Servers). Alternatively, the SBV4200/SBV4200E (E-MTA) and the VT1000 (Stand alone MTA) can provide the capabilities herein, and as such where the CG4500 and CG5500 are mentioned, the SBV4200 and VT1000 can be replaced. Moreover, the embodiments herein have applicability to the international cable telephony marketplaces. Using the inventions herein system equipment for domestic marketplaces can be expanded to cover international marketplaces. Shown in FIG. 1 is an exemplary system to which the present invention is applicable. An MTA, e.g., a CG4500/4500E, is coupled to a server (e.g., an EMS), which has a workstation via which a system operator can configure the modem as desired with national deviations for its line signaling protocols. The MIB is stored in the EMS (or is accessible to the EMS, and can be transferred over the network to the modem) using SNMP protocol, for example.

The embodiments of the present invention include MIB objects needed to support International Telephony operations using Motorola's Cable Telephone System and Products.

The embodiments of the present invention relate to telephony over community cable distribution systems.

One embodiment of the present invention uses standard Simple Network Management Protocol (SNMP) Version 2 (SNMPv2) methods. SNMP is a standardized method of managing and monitoring network devices on TCP/IP-based Internets. That is, the embodiment uses Element Management Systems capable of understanding and using the MIB objects as well as Managed Devices that actually implement the MIB objects.

In addition, the embodiments use configuration files using TLV's that represent initial states for each object. The SNMP-standard usage affords the ability to initialize managed devices automatically according to their in-country parameters before they begin to offer telephony services to callers. While all MTAs can be initialized using SNMP (using manual SNMP SETS or scripted intervention), an MTA could also be "Initialized" using TFTP to download a config file (with TLVs) to set the initial MIB values then use SNMP to monitor or reconfigure MIB setting.

The embodiments of the present invention include MIB objects that are applicable to ETSI for its version of PacketCable's NCS MIB (PKT-SP-MIB-NCS-I01-991201, which is now PKT-SP-MIB-SIG-I05-021127). These objects taken together define behaviors needed by customer premises equipment (CPE for cable telephony) to operate successfully in the widest selection of International Marketplaces possible.

The products and systems made possible by the present invention are capable of operating in a variety of international marketplaces. As part of solving this problem, the system uses SNMP to manage parameters in various devices (but particularly in CPE) that define these operations. A set of MIB objects is defined through which SNMP-capable workstations are able to effect these controls.

Effective support for internationalization in this system requires the flexibility to configure operations in the following principle areas:

1. Pulse Signals:
    a. Hook Flash (see e.g., PktcNcsEndPntConfigMinHookFlash, and PktcNcsEndPntConfigMaxHookFlash)
    b. Dial-Pulse (see e.g., PktcNcsEndPntConfigPulseDialInterdigitTime, PktcNcsEndPntConfigPulseDialMinMakeTime, PktcNcsEndPntConfigPulseDialMaxMakeTime, PktcNcsEndPntConfigPulseDialMinBreakTime, and PktcNcsEndPntConfigPulseDialMaxBreakTime)
2. Call Progress Signals:
    a. Ringing Cadences (see e.g., PktcSigDevRingCadenceTable, PktcSigDevRingCadenceEntry, PktcSigDevRingCadenceIndex, PktcSigDevRingCadence, and PktcSigDevStandardRingCadence)
        i. One standard ring
        ii. One splash ring (see e.g., PktcSigDevRingSplashCadence)
        iii. Multiple custom rings
    b. Tone Signaling (see e.g., PktcSigDevToneTable, PktcSigDevToneEntry, PktcSigDevToneType, PktcSigDevToneDbLevel, PktcSigDevToneFreqType, PktcSigDevToneNumFrequencies, PktcSigDevToneFirstFrequency, PktcSigDevToneSecondFrequency, PktcSigDevToneThirdFrequency, PktcSigDevToneFourthFrequency, PktcSigDevToneNumOnOffTimes, PktcSigDevToneFirstToneOn, PktcSigDevToneFirstToneOff, PktcSigDevToneSecondToneOn, PktcSigDevToneSecondToneOff, PktcSigDevToneThirdToneOn, PktcSigDevToneThirdToneOff, PktcSigDevToneFourthToneOn, PktcSigDevToneFourthToneOff, PktcSigDevToneWholeToneRepeatCount, and PktcSigDevToneSteady)
        i. Type (reorder, ringback, fast, busy DTMF, etc.)
        ii. Signal Level
        iii. Signal Frequencies
        iv. Signal Cadences
3. Codec Parameters: (see e.g., PktcSigDevCIDMode, PktcSigDevCIDFskAfterRing, PktcSigDevCIDFskAfterDTAS, PktcSigDevCIDRingAfterFSK, and PktcSigDevCIDDTASAfterLR)
    a. Hook-Switch debounce characteristics (see e.g., PktcNcsEndPntConfigOnHookDebounce, and PktcNcsEndPntConfigOffHookDebounce)
    b. Transmitter/Receiver gain settings (see e.g., PktcNcsEndPntConfigTxGain, and PktcNcsEndPntConfigRxGain)
    c. Jitter buffer settings (primarily size) (see e.g., PktcNcsEndPntConfigNomJitterBufferSize, and PktcNcsEndPntConfigMaxJitterBufferSize)

Each of these parameters describes telephony operations that vary from one marketplace (or country) to another.

Herein each of these parameters is represented using a MIB object. The representations of ringing cadences and tones are set forth as separate MIB tables, one for ringing cadences and one for tone. In each case, the variations evident in different markets are captured and encoded into a set of MIB objects such that all necessary degrees of freedom are present in that representation.

The representations of these objects in MIB format affords the following advantages:

1. standardization in MIB's to enable interoperability between multiple vendors' products.
2. Management of these objects using standard SNMP technology—meaning that element management systems from multiple vendors will be able to manage the device.
3. Initialization of these objects during start-up times could employ vendor agreed upon uses standard configuration files (at least with respect to supporting populating/initializing the MIB objects set forth herein) containing representations, via Type-Length-Value (TLV) format, also common in SNMP-based systems.

It should be noted that solving the international telephony operations problem requires that all of these be implemented in the system. If any one were missing, the scope of available marketplaces will be reduced by that omission.

Following is a listing of the exemplary MIB objects according to various aspects of the present invention. These MIB objects can be encoded on computer-readable media and embedded in customer premises equipment to perform the functions stated above. Various ones of these objects represent various aspects of the present invention, and may be used alone or in combination with other ones, as necessary or as desired.

The values chosen in these objects are selected to provide the maximum variability of the given element to enable the object to conform to any existing national deviation, and to accommodate some potential changes in these national deviations. Moreover, adjustments to these values can provide additional variability based on new requirements, which adjustments should be understood by one of skill in this field based on this disclosure.

MIB Object Listings

The following MIB Objects are repeated in every CPE device for each telephone port:

```
pktcNcsEndPntConfigMinHookFlash    OBJECT-TYPE
    SYNTAX          Integer32 (1..1000)
    UNITS           "Milliseconds"
    MAX-ACCESS      read-create
    STATUS          current
    DESCRIPTION
        " This is the minimum time a line needs to be
on hook for a valid
            hook flash."
    DEFVAL { 300 }
    ::= { pktcNcsEndPntConfigEntry 31 }
pktcNcsEndPntConfigMaxHookFlash    OBJECT-TYPE
    SYNTAX          Integer32 (1..1800)
    UNITS           "Milliseconds"
    MAX-ACCESS      read-create
    STATUS          current
    DESCRIPTION
        " This is the maximum time a line needs to be
on hook for a valid
            hook flash."
    DEFVAL { 1000 }
    ::= { pktcNcsEndPntConfigEntry 32 }
pktcNcsEndPntConfigPulseDialInterdigitTime    OBJECT-TYPE
    SYNTAX          Integer32 (100..1500)
    UNITS           "Milliseconds"
    MAX-ACCESS      read-create
    STATUS          current
    DESCRIPTION
        " This is the pulse dial inter-digit timeout."
    DEFVAL { 100 }
    ::= { pktcNcsEndPntConfigEntry 33 }
pktcNcsEndPntConfigPulseDialMinMakeTime    OBJECT-TYPE
    SYNTAX          Integer32 (1..200)
    UNITS           "Milliseconds"
    MAX-ACCESS      read-create
    STATUS          current
    DESCRIPTION
        " This is the minimum make pulse width for the
dial pulse."
    DEFVAL { 25 }
    ::= { pktcNcsEndPntConfigEntry 34 }
pktcNcsEndPntConfigpulseDialMaxMakeTime    OBJECT-TYPE
    SYNTAX          Integer32 (1..200)
    UNITS           "Milliseconds"
    MAX-ACCESS      read-create
    STATUS          current
    DESCRIPTION
```

-continued

```
        " This is the maximum make pulse width for the
dial pulse."
    DEFVAL { 55 }
    ::= { pktcNcsEndPntConfigEntry 35 }
pktcNcsEndPntConfigPulseDialMinBreakTime    OBJECT-TYPE
    SYNTAX          Integer32 (1..200)
    UNITS           "Milliseconds"
    MAX-ACCESS      read-create
    STATUS          current
    DESCRIPTION
        " This is the minimum break pulse width for the
dial pulse."
    DEFVAL { 45 }
    ::= { pktcNcsEndPntConfigEntry 36 }
pktcNcsEndPntConfigPulseDialMaxBreakTime    OBJECT-TYPE
    SYNTAX          Integer32 (1..200)
    UNITS           "Milliseconds"
    MAX-ACCESS      read-create
    STATUS          current
    DESCRIPTION
        " This is the maximum break pulse width for the
dial pulse."
    DEFVAL { 75 }
    ::= { pktcNcsEndPntConfigEntry 37 }
pktcNcsEndPntConfigNomJitterBufferSize    OBJECT-TYPE
    SYNTAX          Integer32
    UNITS           "Milliseconds"
    MAX-ACCESS      read-create
    STATUS          current
    DESCRIPTION
        " The current setting for the nominal amount of
jitter the
            bti can compensate."
    ::= { pktcNcsEndPntConfigEntry 38 }
pktcNcsEndPntConfigMaxJitterBufferSize    OBJECT-TYPE
    SYNTAX          Integer32
    UNITS           "Milliseconds"
    MAX-ACCESS      read-create
    STATUS          current
    DESCRIPTION
        " The current setting for the maximum
amount of jitter the
            bti can compensate ."
    ::= { pktcNcsEndPntConfigEntry 39 }
pktcNcsEndPntConfigOnHookDebounce    OBJECT-TYPE
    SYNTAX          Integer32 (1..1000)
    UNITS           "Milliseconds"
    MAX-ACCESS      read-create
    STATUS          current
    DESCRIPTION
        " The length of the on-hook debounce."
    DEFVAL { 200 }
    ::= { pktcNcsEndPntConfigEntry 40 }
pktcNcsEndPntConfigOffHookDebounce    OBJECT-TYPE
    SYNTAX          Integer32 (1..1000)
    UNITS           "Milliseconds"
    MAX-ACCESS      read-create
    STATUS          current
    DESCRIPTION
        " The length of the off hook debounce."
    DEFVAL { 100 }
    ::= { pktcNcsEndPntConfigEntry 41 }
pktcNcsEndPntConfigTxGain    OBJECT-TYPE
    SYNTAX          Integer32 (−14..14)
    UNITS           "dB"
    MAX-ACCESS      read-create
    STATUS          current
    DESCRIPTION
        " The per line transmitter gain."
    DEFVAL { 0 }
    ::= { pktcNcsEndPntConfigEntry 42 }
pktcNcsEndPntConfigRxGain    OBJECT-TYPE
    SYNTAX          Integer32 (−14..14)
    UNITS           "dB"
    MAX-ACCESS      read-create
    STATUS          current
```

```
            -continued
         DESCRIPTION
            " The per line receiver gain."
            DEFVAL { 0 }
            ::= { pktcNcsEndPntConfigEntry 43 }
```

The following MIB objects are present once for each CPE device, independent of the number of telephone ports:

```
      pktcSigDevCIDMode    OBJECT-TYPE
         SYNTAX       INTEGER {
                         northAmerican (1),
                         duringRingingETS (2),
                         dtAsETS (3),
                         rpAsETS (4),
                         lrAsETS (5)
                         }
         MAX-ACCESS read-write
         STATUS current
         DESCRIPTION
```

"For both on-hook and off-hook Caller ID, pktcSigDev-CIDMode selects between North American modulation (BellCore 202) and ETS modulation V.23). For on-hook Caller ID, it also selects between sending the FSK between the first and second ring pattern (northAmerican and duringRingingETS), Dual Tone Alert Signal (DtAsETS), after a Ring Pulse (rsAsETS) or, after a Line Reversal followed by a Dual Tone Alert Signal (lrAsETS)."

```
         DEFVAL { northAmerican }
         ::= {pktcSigDevConfigObjects 28 }
      pktcSigDevCIDFskAfterRing    OBJECT-TYPE
         SYNTAX       Integer32 (500..2000)
         UNITS        "Milliseconds"
         MAX-ACCESS   read-write
         STATUS       current
         DESCRIPTION
```

"Determines the delay between the end of first ringing pattern and the transmission of the FSK containing the CallerID information. It is only used when pktcSigDevCID-Mode is northAmerican or duringRingingETS."

```
         DEFVAL { 550 }
         ::= {pktcSigDevConfigObjects 29 }
      pktcSigDevCIDFskAfterDTAS    OBJECT-TYPE
         SYNTAX       Integer32 (45..500)
         UNITS        "Milliseconds"
         MAX-ACCESS   read-write
         STATUS       current
         DESCRIPTION
```

"Determines the delay between the Dual Tone Alert Signal (DT-AS) the transmission of the FSK containing the Caller ID information. It is only used when pktcSigDev-CIDMode is dtAsETS or lrAsETS."

```
         ::= {pktcSigDevConfigObjects 30 }
      pktcSigDevCIDRingAfterFSK    OBJECT-TYPE
         SYNTAX       Integer32 (200..500)
         UNITS        "Milliseconds"
         MAX-ACCESS   read-write
         STATUS       current
         DESCRIPTION
```

"Determines the delay between the complete transmission of the FSK containing the Caller ID information and the first ring pattern. It is only used when pktcSigDevCIDMode is dtAsETS, rpAsETS or lrAsETS."

```
         ::= {pktcSigDevConfigObjects 31 }
      pktcSigDevCIDDTASAfterLR     OBJECT-TYPE
         SYNTAX       Integer32 (100..655)
         UNITS        "Milliseconds"
         MAX-ACCESS   read-write
         STATUS       current
         DESCRIPTION
```

"Determines the delay between the end of the Line Reversal and Dual Tone Alert Signal (DT-AS). It is only used when pktcSigDevCIDMode is lrAsETS."

```
         ::= {pktcSigDevConfigObjects 32 }
      pktcSigPulseSignalTable      OBJECT-TYPE
         SYNTAX       SEQUENCE OF PktcSigPulseSignalEntry
         MAX-ACCESS   not-accessible
         STATUS       current
         DESCRIPTION
```

"The Pulse signal table defines the pulse signal operation. There are four types of international pulse signals, initial ring, meter pulse, reverse polarity and no battery. The Pulse duration type is specific and it is specified with a 1 to 32 value."

```
         ::= { pktcSigDevConfigObjects 27 }
      pktcSigPulseSignalEntry      OBJECT-TYPE
         SYNTAX       PktcSigPulseSignalEntry
         MAX-ACCESS   not-accessible
         STATUS       current
```

-continued

```
        DESCRIPTION
            " Unique value ranging from 1 to 32 that will
    correspond to the value specified by the operator."
            INDEX { pktcSigPulseSignalIndex }
            ::= { pktcSigPulseSignalTable 1 }
    PktcSigPulseSignalEntry ::= SEQUENCE {
        pktcSigPulseSignalIndex             Integer32,
        pktcSigPulseSignalDuration          Integer32,
        pktcSigPulseSignalType              INTEGER,
        pktcSigPulseSignalDbLevel           Integer32,
        pktcSigPulseSignalFrequency         INTEGER,
        pktcSigPulseSignalRepeatCount       Integer32,
        pktcSigPulseSignalPauseDuration     Integer32}
    pktcSigPulseSignalIndex     OBJECT-TYPE
        SYNTAX              Integer32 (1..32)
        MAX-ACCESS          not-accessible
        STATUS              current
        DESCRIPTION
```

"The table index equivalent to the operator specific pulse type and duration."

```
            ::= { pktcSigPulseSignalEntry 1 }
    pktcSigPulseSignalDuration      OBJECT-TYPE
        SYNTAX              Integer32 (1..5000)
        UNITS               "Milliseconds"
        MAX-ACCESS          read-write
        STATUS              current
        DESCRIPTION
            " The pulse duration varies according to the
    operator and country."
        DEFVAL { 1000 }
        ::= {pktcSigPulseSignalEntry 2 }
    pktcSigPulseSignalType      OBJECT-TYPE
        SYNTAX              INTEGER
                            {
                              initialRing (1),
                              meterPulse (2),
                              reversePolarity (3),
                              noBattery (4)
                            }
        MAX-ACCESS          read-write
        STATUS              current
        DESCRIPTION
            " There are four types of international pulse
    signals."
        DEFVAL { initialRing }
        ::= { pktcSigPulseSignalEntry 3 }
    pktcSigPulseSignalDbLevel       OBJECT-TYPE
        SYNTAX              Integer32 (-25..15)
        UNITS               "dbm"
        MAX-ACCESS          read-write
        STATUS              current
        DESCRIPTION
            " This is the decibel level at which the meter
    pulse could be generated."
        ::= {pktcSigPulseSignalEntry 4 }
    pktcSigPulseSignalFrequency     OBJECT-TYPE
        SYNTAX              INTEGER {
                              fifty (1),
                              twelvethousand (2),
                              sixteenthousand (3)
                            }
        UNITS               "Hertz"
        MAX-ACCESS          read-write
        STATUS              current
        DESCRIPTION
            " This is the frequency at which the meter
    pulse could be generated."
        ::= { pktcSigPulseSignalEntry 5}
    pktcSigPulseSignalRepeatCount       OBJECT-TYPE
        SYNTAX              Integer32 (0..5000)
        MAX-ACCESS          read-write
        STATUS              current
        DESCRIPTION
```

-continued

```
            " This is the repeat count, which signifies
    how many times to repeat the pulse."
            ::={ pktcSigPulseSignalEntry 6 }
    pktcSigPulseSignalPauseDuration     OBJECT-TYPE
        SYNTAX              Integer32 (1..5000)
        UNITS               "Milliseconds"
        MAX-ACCESS          read-write
        STATUS              current
        DESCRIPTION
            " The pause duration between pulses varies
    according to the operator and country."
        ::= {pktcSigPulseSignalEntry 7 }
```

The following MIB objects describe the ring cadences and are present once for each device:

```
    pktcSigDevRingCadenceTable      OBJECT-TYPE
        SYNTAX          SEQUENCE OF PktcSigDevRingCadenceEntry
        MAX-ACCESS      not-accessible
        STATUS          current
        DESCRIPTION
```

"In V5.2, Cadence rings are defined by the telco governing body for each country. The MTA must be able to support various ranges of cadence patterns and cadence periods. The MTA will be able to support country specific provisioning of the cadence and idle period. There will be at most 3 on/off transitions per cadence period. Each cadence pattern will be assigned a unique value ranging 1–128 corresponding to the value sent by the LE SIGNAL plus one. MTA will derive the cadence periods from the ring Cadence table entry as provisioned by the customer."

```
            ::= { pktcSigDevConfigObjects 33 }
    pktcSigDevRingCadenceEntry      OBJECT-TYPE
        SYNTAX          PktcSigDevRingCadenceEntry
        MAX-ACCESS      not-accessible
        STATUS          current
        DESCRIPTION
```

"Unique value ranging from 1 to 128 that corresponds to the value sent by the LE (plus one) based on country specific cadences, row per cadence cycle. In any given system implementation for a particular country, it is anticipated that a small number of ring cadences will be in use. Thus, this table most likely will not be populated to its full 128-row size."

```
            INDEX { pktcSigDevRingCadenceIndex }
            ::= { pktcSigDevRingCadenceTable 1 }
    pktcSigDevRingCadenceIndex      OBJECT-TYPE
        SYNTAX          Integer32 (1..128)
        MAX-ACCESS      not-accessible
        STATUS          current
        DESCRIPTION
            " The table index equivalent to the country
    specific cadence (1 - 128)."
        ::= { pktcSigDevRingCadenceEntry 1 }
    pktcSigDevRingCadence       OBJECT-TYPE
        SYNTAX          OCTET STRING (SIZE(2..28))
        MAX-ACCESS      read-write
        STATUS          current
        DESCRIPTION
```

"This is the Ring Cadence Octet String. The first octet of the bit string represents the length in bits of the duration of the cadence. Each Bit after the first octet represents 50 ms and 1 represents ring and 0 represent silent. The first bit of the second octet is the first bit of the ring cadence. Only 216 can be set total to represent 10800 ms of total cadence cycle."

```
    ::= { pktcSigDevRingCadenceEntry 2 }
    SYNTAX          OCTET STRING (SIZE(2..28))
    MAX-ACCESS      read-write
    STATUS          current
    DESCRIPTION
```

"This is the Ring Cadence Octet String for the standard ring. The first octet of the bit string represents the length in bits of the duration of the cadence Each Bit after the first octet represents 50 ms and 1 represents ring and 0 represent silent. The first bit of the second octet is the first bit of the ring cadence. Only 216 Bits can be set total to represent 10800 ms of total cadence cycle."

```
    ::= { pktcSigDevConfigObjects 34 }
pktcSigDevRingSplashCadence    OBJECT-TYPE
    SYNTAX          OCTET STRING (SIZE(2..28))
    MAX-ACCESS      read-write
    STATUS          current
    DESCRIPTION
```

"This is the Ring Cadence Octet String for splash ring. The first octet of the bit string represents the length in bits of the duration of the cadence. Each Bit after the first octet represents 50 ms and 1 represents ring and 0 represent silent. The first bit of the second octet is the first bit of the ring cadence. Only 216 Bits can be set total to represent 10800 ms of total cadence cycle."
    ::={pktcSigDevConfigObjects 35}

The following MIB objects describe the tone table and are present once for each device:

```
pktcSigDevToneTable     OBJECT-TYPE
    SYNTAX          SEQUENCE OF PktcSigDevToneEntry
    MAX-ACCESS      not-accessible
    STATUS          current
    DESCRIPTION
        " The Tone Table defines the various tone operations."
    ::= { pktcSigDevConfigObjects 36 }
pktcSigDevToneEntry     OBJECT-TYPE
    SYNTAX          PktcSigDevToneEntry
    MAX-ACCESS      not-accessible
    STATUS          current
    DESCRIPTION
        " Unique value ranging from 1 to 49 that will
correspond to the different tone types that are being
supported by the device. These tones can be provisioned
based on country specific needs."
    INDEX { pktcsigDevToneType }
    ::= { pktcSigDevToneTable 1 }
PktcSigDevToneEntry ::= SEQUENCE {
    pktcSigDevToneType              INTEGER,
    pktcSigDevToneDbLevel           Integer32,
    pktcSigDevToneFreqType          INTEGER,
    pktcSigDevToneNumFrequencies    Integer32,
    pktcSigDevToneFirstFrequency    Integer32,
    pktcSigDevToneSecondFrequency   Integer32,
    pktcSigDevToneThirdFrequency    Integer32,
```

-continued

```
    pktcSigDevToneFourthFrequency       Integer32,
    pktcSigDevToneNumOnOffTimes         Integer32,
    pktcSigDevToneFirstToneOn           Integer32,
    pktcSigDevToneFirstToneOff          Integer32,
    pktcSigDevToneSecondToneOn          Integer32,
    pktcSigDevToneSecondToneOff         Integer32,
    pktcSigDevToneThirdToneOn           Integer32,
    pktcSigDevToneThirdToneOff          Integer32,
    pktcSigDevToneFourthToneOn          Integer32,
    pktcSigDevToneFourthToneOff         Integer32,
    pktcSigDevToneWholeToneRepeatCount  Integer32,
    pktcSigDevToneSteady                TruthValue
    }
pktcSigDevToneType      OBJECT-TYPE
    SYNTAX          INTEGER {
                    dtmf0(0),
                    dtmf1(1),
                    dtmf2(2),
                    dtmf3(3),
                    dtmf4(4),
                    dtmf5(5),
                    dtmf6(6),
                    dtmf7(7),
                    dtmf8(8),
                    dtmf9(9),
                    dtmfToneStar(10),
                    dtmfTonePound(11),
                    dtmfA(12),
                    dtmfB(13),
                    dtmfC(14),
                    dtmfD(15),
                    busy(16),
                    confirmation(17),
                    dial(18),
                    messageWaiting(19),
                    offHookWarning(20),
                    ringBack(21),
                    reOrder(22),
                    stutterdial(23),
                    loopback(24),
                    callWaiting1(25),
                    callWaiting2(26),
                    callWaiting3(27),
                    callWaiting4(28),
                    alertingSignal(29),
                    testTone(30),
                    specialDial(31),
                    specialInfo(32),
                    release(33),
                    congestion(34),
                    userDefinedOne(35),
                    }
    MAX-ACCESS      read-only
    STATUS          current
    DESCRIPTION
        " This defines the type of tone being accessed."
    ::={pktcSigDevToneEntry 1 }
pktcSigDevToneDbLevel       OBJECT-TYPE
    SYNTAX          Integer32 (−60..4)
    UNITS           "dbm"
    MAX-ACCESS      read-write
    STATUS          current
    DESCRIPTION
        " This is the decibel level at which tones could be generated."
    DEFVAL { −4 }
    ::={pktcSigDevToneEntry 2 }
pktcSigDevToneFreqType      OBJECT-TYPE
    SYNTAX          INTEGER {
                    allFrequencies (1),
                    singleFrequecySequence (2),
                    dualFrequencySequence (3),
                    allFrequenciesModulated (4)
                    }
    MAX-ACCESS      read-write
    STATUS          current
    DESCRIPTION
```

"This object describes how the frequencies are applied.

allFrequencies indicates all frequences specifed by btiToneNumFrequencies are mixed to form a single tone. The tone is then applied in sequence using the number of on/off times specified in btiToneNumOnOffTimes.

singleFrequecySequence indicates all frequencies specified by btiToneNumFrequencies are applied in sequence using the corresponding frequency number on/off time (eg. btiToneFirstFrequency uses btiToneFirstToneOn and btiToneFirstToneOff, btiToneSecondFrequency uses btiToneSecondToneOn and btiToneSecondToneOff, . . . ). For this tone type btiToneNumFrequencies MUST equal btiToneNumOnOffTimes.

dualFrequencySequence indicates two pairs of frequencies are mixed to form two sequenced tones. The first and second frequency are mixed to form tone one and are applied using btiToneFirstToneOn and btiToneFirstToneOff. The third and forth frequency are mixed to form tone two and are applied using btiToneSecondToneOn and btiToneSecondToneOff. For this tone type btiToneNumFrequencies MUST equal 4 and btiToneNumOnOffTimes MUST equal 2 allFrequenciesModulated indicates all frequences specifed by btiToneNumFrequencies are modulated to form a single tone.

The tone is then applied in sequence using the number of on/off times specified in btiToneNumOnOffTimes."

```
                DEFVAL { allFrequencies }
                ::={ pktcSigDevToneEntry 3 }
        pktcSiqDevToneNumFrequencies    OBJECT-TYPE
            SYNTAX              Integer32 (1 .. 4)
            MAX-ACCESS          read-write
            STATUS              current
            DESCRIPTION
                " Specifies the number of frequencies specified
in the table entry."
                DEFVAL { 1 }
                ::={pktcSigDevToneEntry 4}
        pktcSigDevToneFirstFrequency    OBJECT-TYPE
            SYNTAX              Integer32 (0..4000)
            UNITS               "Hertz"
            MAX-ACCESS          read-write
            STATUS              current
            DESCRIPTION
                " This is the first frequency at which the
tones could be generated in a multiple frequency tone."
                ::={pktcSigDevToneEntry 5}
        pktcSigDevToneSecondFrequency    OBJECT-TYPE
            SYNTAX              Integer32 (0..4000)
            UNITS               "Hertz"
            MAX-ACCESS          read-write
            STATUS              current
            DESCRIPTION
```

"This is the first frequency at which the tones could be generated in a ultiple frequency tone."

```
                ::={pktcSigDevToneEntry 6}
        pktcSigDevToneThirdFrequency    OBJECT-TYPE
            SYNTAX              Integer32 (0..4000)
            UNITS               "Hertz"
            MAX-ACCESS          read-write
            STATUS              current
            DESCRIPTION
                " This is the third frequency at which the
tones could be generated."
                ::={pktcSigDevToneEntry 7}
        pktcSigDevToneFourthFrequency    OBJECT-TYPE
```

-continued

```
            SYNTAX              Integer32 (0..4000)
            UNITS               "Hertz"
            MAX-ACCESS          read-write
            STATUS              current
            DESCRIPTION
```

"This is the fourth frequency at which the tones could be generated."

```
                ::={pktcSigDevToneEntry 8}
        pktcSigDevToneNumOnOffTimes    OBJECT-TYPE
            SYNTAX              Integer32 (1..4)
            MAX-ACCESS          read-write
            STATUS              current
            DESCRIPTION
                " Specifies the number of on/off times
specified in the table entry."
                DEFVAL { 1 }
                ::={pktcSigDevToneEntry 9}
        pktcSigDevToneFirstToneOn    OBJECT-TYPE
            SYNTAX              Integer32 (0..5000)
            UNITS               "Milliseconds"
            MAX-ACCESS          read-write
            STATUS              current
            DESCRIPTION
                " This is the first tone interval."
                ::={ pktcSigDevToneEntry 10}
        pktcSigDevToneFirstToneOff    OBJECT-TYPE
            SYNTAX              Integer32 (0..5000)
            UNITS               "Milliseconds"
            MAX-ACCESS          read-write
            STATUS              current
            DESCRIPTION
                " This is the first idle interval."
                ::={ pktcSigDevToneEntry 11 }
        pktcSigDevToneSecondToneOn    OBJECT-TYPE
            SYNTAX              Integer32 (0..5000)
            UNITS               "Milliseconds"
            MAX-ACCESS          read-write
            STATUS              current
            DESCRIPTION
                " This is the second tone interval."
                ::={ pktcSigDevToneEntry 12 }
        pktcSigDevToneSecondToneOff    OBJECT-TYPE
            SYNTAX              Integer32 (0..5000)
            UNITS               "Milliseconds"
            MAX-ACCESS          read-write
            STATUS              current
            DESCRIPTION
                " This is the second idle interval."
                ::={ pktcSigDevToneEntry 13 }
        pktcSigDevToneThirdToneOn    OBJECT-TYPE
            SYNTAX              Integer32 (0..5000)
            UNITS               "Milliseconds"
            MAX-ACCESS          read-write
            STATUS              current
            DESCRIPTION
                " This is the third tone interval."
                ::={ pktcSigDevToneEntry 14 }
        pktcSigDevToneThirdToneOff    OBJECT-TYPE
            SYNTAX              Integer32 (0..5000)
            UNITS               "Milliseconds"
            MAX-ACCESS          read-write
            STATUS              current
            DESCRIPTION
                " This is the third idle interval."
                ::={ pktcSigDevToneEntry 15 }
        pktcSigDevToneFourthToneOn    OBJECT-TYPE
            SYNTAX              Integer32 (0..5000)
            UNITS               "Milliseconds"
            MAX-ACCESS          read-write
            STATUS              current
            DESCRIPTION
                " This is the fourth tone interval."
                ::={ pktcSigDevToneEntry 16 }
```

-continued

```
pktcSigDevToneFourthToneOff    OBJECT-TYPE
    SYNTAX          Integer32 (0..5000)
    UNITS           "Milliseconds"
    MAX-ACCESS      read-write
    STATUS          current
    DESCRIPTION
        " This is the Fourth idle interval."
    ::={ pktcSigDevToneEntry 17 }
pktcSigDevToneWholeToneRepeatCount    OBJECT-TYPE
    SYNTAX          Integer32 (0..5000)
    MAX-ACCESS      read-write
    STATUS          current
    DESCRIPTION
```

"This is the repeat count, which signifies how many times to repeat the entire on-off sequence."

```
        ::={ pktcSigDevToneEntry 18 }
pktcSigDevToneSteady    OBJECT-TYPE
    SYNTAX          TruthValue
    MAX-ACCESS      read-write
    STATUS          current
    DESCRIPTION
        " This is the steady tone. Set to true to
continue the last tone after on-off sequence."
        ::={ pktcSigDevToneEntry 19 }
```

The following MIB Object describes all contained objects that relate to the internationalization:

```
pktcInternationalGroup    OBJECT-GROUP
    OBJECTS {
        pktcNcsEndPntConfigMinHookFlash,
        pktcNcsEndPntConfigMaxHookFlash,
        pktcNcsEndPntConfigNomJitterBufferSize,
        pktcNcsEndPntConfigMaxJitterBufferSize,
        pktcNcsEndPntConfigOnHookDebounce,
        pktcNcsEndPntConfigOffHookDebounce,
        pktcNcsEndPntConfigTxGain,
        pktcNcsEndPntConfigRxGain,
        pktcNcsEndPntConfigPulseDialInterdigitTime,
        pktcNcsEndPntConfigPulseDialMinMakeTime,
        pktcNcsEndPntConfigPulseDialMaxMakeTime,
        pktcNcsEndPntConfigPulseDialMinBreakTime,
        pktcNcsEndPntConfigPulseDialMaxBreakTime,
        pktcSigDevRingCadence,
        pktcSigDevStandardRingCadence,
        pktcSigDevRingSplashCadence,
        pktcSigDevCIDMode,
        pktcSigDevCIDFskAfterRing,
        pktcSigDevCIDFskAfterDTAS,
        pktcSigDevCIDRingAfterFSK,
        pktcSigDevCIDDTASAfterLR,
        pktcSigPowerRingFrequency,
        pktcSigPCMCoding,
        pktcSigPulseSignalDuration,
        pktcSigPulseSignalType,
        pktcSigPulseSignalDbLevel,
        pktcSigPulseSignalFrequency,
        pktcSigPulseSignalRepeatCount,
        pktcSigPulseSignalPauseDuration,
        pktcSigDevToneType,
        pktcSigDevToneDbLevel,
        pktcSigDevToneFreqType,
        pktcSigDevToneNumFrequencies,
        pktcSigDevToneFirstFrequency,
        pktcSigDevToneSecondFrequency,
        pktcSigDevToneThirdFrequency,
        pktcSigDevToneFourthFrequency,
        pktcSigDevToneNumOnOffTimes,
        pktcSigDevToneFirstToneOn,
```

-continued

```
        pktcSigDevToneFirstToneOff,
        pktcSigDevToneSecondToneOn,
        pktcSigDevToneSecondToneOff,
        pktcSigDevToneThirdToneOn,
        pktcSigDevToneThirdToneOff,
        pktcSigDevToneFourthToneOn,
        pktcSigDevToneFourthToneOff,
        pktcSigDevToneWholeToneRepeatCount,
        pktcSigDevToneSteady
        }
    STATUS current
    DESCRIPTION
```

"Group of objects that extend the behavior of existing objects to support operations in the widest possible set of international marketplaces. Note that many of these objects represent a superset of behaviors described in other objects within this MIB Module. In such cases, is left to manufacturers to determine whether to support both objects in the same device."
::={pktcSigGroups 3}

Although various embodiments are specifically illustrated and described herein, it will be appreciated that modifications and variations of the invention are covered by the above teachings and are within the purview of the appended claims without departing from the spirit and intended scope of the invention. For example, certain protocols are discussed for sending the MIB objects to the telephony device, however, others could be employed. Furthermore, this example should not be interpreted to limit the modifications and variations of the invention covered by the claims but is merely illustrative of possible variations.

What is claimed is:

1. A telephony device for operating in accordance with one or more national standards comprising:
   one or more telephone ports to couple to a local exchange;
   a memory; and
   a processor coupled to the memory and being programmed to accept a plurality of downloadable values that can be downloaded to the telephony device over an Internet Protocol network and stored in the memory, wherein each of the plurality of values are defined as a management information base object or a management information base table that includes one or more management information base objects, said plurality of values including:
   a first set of management information base objects, one set for each of the one or more telephone ports, said first set of management information base objects controlling a first set of operations of the telephony device, said first set of operations including hook flash operations, pulse dialing operations, jitter buffer size, debounce characteristics, transmitter gain and receiver gain;
   a second set of management information base objects, a number of which are independent of a number of the one or more telephone ports, said second set of management information base objects controlling a second set of operations of the telephony device, said second set of operations including caller identification functionality;
   a first management information base table controlling pulse signaling operations for the telephony device;
   a second management information base table controlling ringing cadence operations for the telephony device; and a third management information base table controlling tone operations for the telephony device.

2. The device according to claim 1, wherein said first set of management information base objects includes:
a minimum hook flash value establishing a minimum time a line needs to be on hook for a valid hook flash operation.

3. The device according to claim 2, wherein said minimum hook flash value has an integer range between about 1 millisecond and about 1000 milliseconds.

4. The device according to claim 3, wherein said minimum hook flash value has a default value of about 300 milliseconds.

5. The device according to claim 1, wherein said first set of management information base objects includes:
a maximum hook flash value establishing a maximum time a line needs to be on hook for a valid hook flash operation.

6. The device according to claim 5, wherein said maximum hook flash value has an integer range between about 1 millisecond and about 1800 milliseconds.

7. The device according to claim 6, wherein said maximum hook flash value has a default value of about 1000 milliseconds.

8. The device according to claim 1, wherein said first set of management information base objects includes:
a pulse dial inter-digit time value establishing a pulse dial inter-digit timeout value.

9. The device according to claim 8, wherein said pulse dial inter-digit time value has an integer range between about 100 milliseconds and about 1500 milliseconds.

10. The device according to claim 9, wherein said pulse dial inter-digit time value has a default value of about 100 milliseconds.

11. The device according to claim 1, wherein said first set of management information base objects includes:
a pulse dial minimum make time value establishing a minimum make pulse width for a dial pulse.

12. The device according to claim 11, wherein said pulse dial minimum make time value has an integer range between about 1 millisecond and about 200 milliseconds.

13. The device according to claim 12, wherein said pulse dial minimum make value has a default value of about 25 milliseconds.

14. The device according to claim 1, wherein said first set of management information base objects includes:
a pulse dial maximum make time value establishing a maximum make pulse width for a dial pulse.

15. The device according to claim 14, wherein said pulse dial maximum make time value has an integer range between about 1 millisecond and about 200 milliseconds.

16. The device according to claim 15, wherein said pulse dial maximum make time value has a default value of about 55 milliseconds.

17. The device according to claim 1, wherein said first set of management information base objects includes:
a pulse dial minimum break time value establishing a minimum break pulse width for a dial pulse.

18. The device according to claim 17, wherein said pulse dial minimum break time value has an integer range between about 1 millisecond and about 200 milliseconds.

19. The device according to claim 18, wherein said pulse dial minimum break time value has a default value of about 45 milliseconds.

20. The device according to claim 1, wherein said first set of management information base objects includes:
a pulse dial maximum break time value establishing a maximum break pulse width for a dial pulse.

21. The device according to claim 20, wherein said pulse dial maximum break time value has an integer range between about 1 millisecond and about 200 milliseconds.

22. The device according to claim 21, wherein said pulse dial maximum break time value has a default value of about 75 milliseconds.

23. The device according to claim 1, wherein said first set of management information base objects includes:
a nominal jitter buffer size value establishing a nominal jitter buffer size for receiving data bits.

24. The device according to claim 23, wherein said nominal jitter buffer size has an integer range between about 0 milliseconds and about 160 milliseconds.

25. The device according to claim 24, wherein said nominal jitter buffer size has a default value of about 15 milliseconds.

26. The device according to claim 1, wherein said first set of management information base objects includes:
a maximum jitter buffer size value establishing a maximum jitter buffer size for receiving data bits.

27. The device according to claim 26, wherein said maximum jitter buffer size value has an integer range between about 0 milliseconds and about 160 milliseconds.

28. The device according to claim 27m wherein said maximum jitter buffer size value has a default value of about 30 milliseconds.

29. The device according to claim 1, wherein said first set of management information base objects includes:
an on-hook debounce value establishing a length of an on-hook debounce.

30. The device according to claim 29, wherein said on-hook debounce value has an integer range between about 1 millisecond and about 1000 milliseconds.

31. The device according to claim 30, wherein said on-hook debounce value has a default value of about 200 milliseconds.

32. The device according to claim 1, wherein said first set of management information base objects includes:
an off-hook debounce value establishing a length of an off-hook debounce.

33. The device according to claim 32, wherein said off-hook debounce value has an integer range between about 1 millisecond and about 1000 milliseconds.

34. The device according to claim 33, wherein said off-hook debounce value has a default value of about 100 milliseconds.

35. The device according to claim 1, wherein said first set of management information base objects includes:
a transmission gain value establishing a gain to be applied to a transmission signal.

36. The device according to claim 35, wherein said transmission gain value has an integer range between about −14 decibels and about 14 decibels.

37. The device according to claim 36, wherein said transmission gain value has a default value of about 0 decibels.

38. The device according to claim 1, wherein said first set of management information base objects includes:
a receiver gain value establishing a gain to be applied to a received signal.

39. The device according to claim 38, wherein said receiver gain value has an integer range between about −14 decibels and about 14 decibels.

40. The device according to claim 39, wherein said receiver gain value has a default value of about 0 decibels.

41. The device according to claim 1, wherein said second set of management information base objects includes:
a caller identification mode value selecting a caller identification mode from among a plurality of caller identification modes for both on-hook and off-hook caller identification.

42. The device according to claim 41, wherein said plurality of caller identification modes includes one or more of the following:
for both on-hook and off-hook caller identification:
(1) North American modulation; and (2) ETS modulation; and
for on-hook caller identification:
(1) sending an FSK signal between a first ring pattern and a second ring pattern; (2) using a dual tone alert signal; (3) sending an FSK signal after a Ring Pulse; and (4) sending an FSK signal after a line reversal followed by a dual tone alert signal.

43. The device according to claim 1, wherein said second set of management information base objects includes:
a caller identification FSK after ring value establishing a delay between an end of a first ringing pattern and a transmission of an FSK signal containing caller identification information.

44. The device according to claim 43, wherein said caller identification FSK after ring value has an integer range between about 500 milliseconds and about 2000 milliseconds.

45. The device according to claim 44, wherein said caller identification FSK after ring value has a default value of about 550 milliseconds.

46. The device according to claim 1, wherein said second set of management information base objects includes:
a caller identification FSK after DTAS value establishing a delay between a dual tone alert signal and a transmission of a frequency shift keyed signal containing caller identification information.

47. The device according to claim 46, wherein said caller identification FSK after DTAS value has an integer range between about 45 milliseconds and about 500 milliseconds.

48. The device according to claim 47, wherein said caller identification FSK after DTAS value has a default value of about 60 milliseconds.

49. The device according to claim 1, wherein said second set of management information base objects includes:
a caller identification ring after FSK value establishing a delay between a complete transmission of a frequency shift keyed signal containing caller identification information and a first ring pattern.

50. The device according to claim 49, wherein said caller identification ring after FSK value has an integer range between about 200 milliseconds and about 500 milliseconds.

51. The device according to claim 50, wherein said caller identification ring after FSK value has a default value of about 250 milliseconds.

52. The device according to claim 1, wherein said second set of management information base objects includes:
a caller identification DTAS after LR value establishing a delay between an end of a line reversal and a dual tone alert signal.

53. The device according to claim 52, wherein said caller identification DTAS after LR value has an integer range between about 100 milliseconds and about 655 milliseconds.

54. The device according to claim 53, wherein said caller identification DTAS after LR value has a default value of about 150 milliseconds.

55. The device according to claim 1, wherein said first management information base table includes:
a pulse signal table defining pulse signal operations.

56. The device according to claim 55, wherein said pulse signal table includes at least four types of international pulse signals.

57. The device according to claim 56, wherein said at least four types of international pulse signals includes one or more of the following: an initial ring signal, a meter pulse signal, a reverse polarity signal and a no battery signal.

58. The device according to claim 55, wherein said pulse signal table includes:
a pulse signal entry value selecting a pulse signal value defined by a system operator, and having an integer range from 1 to 32.

59. The device according to claim 55, wherein said pulse signal table includes:
a pulse signal entry sequence defining a pulse signal index, a pulse signal duration, a pulse signal type, a pulse signal decibel level, a pulse signal frequency and a pulse signal repeat count.

60. The device according to claim 59, wherein said pulse signal index defines a table index equivalent to a system operator specific pulse type and duration, having an integer range between 1 and 32.

61. The device according to claim 59, wherein said pulse signal duration has an integer range between about 1 millisecond and about 5000 milliseconds.

62. The device according to claim 59, wherein said pulse signal type selects between one of at least four types of international pulse signals, including initial ring type, meter pulse type, reverse polarity type and no battery type, having an integer range between 1 and 4, and having a default value selecting initial ring type.

63. The device according to claim 59, wherein said pulse signal decibel level value establishes a decibel level at which a meter pulse can be generated.

64. The device according to claim 63, wherein said pulse signal decibel level value has an integer range between about −25 decibels and about 15 decibels.

65. The device according to claim 64, wherein said pulse signal decibel level value has a default value of about −4 decibels.

66. The device according to claim 59, wherein said pulse signal frequency value establishes a frequency at which a meter pulse can be generated.

67. The device according to claim 66, wherein said pulse signal frequency value has an integer range between 1 and 3 thereby selecting among about twelve Hertz, about twelve thousand Hertz and about sixteen thousand Hertz.

68. The device according to claim 59, wherein said pulse signal repeat count value establishes how many times to repeat a meter pulse.

69. The device according to claim 68, wherein said pulse signal repeat count value has an integer range between about 0 and about 5000.

70. The device according to claim 1, wherein said second management information base table includes a ring cadence table.

71. The device according to claim 70, wherein the ring cadence table includes definitions for a plurality of cadence rings so that the telephony device can support various ranges of cadence patterns and cadence periods including country specific provisioning of a cadence period and an idle period, in which there are at most three on/off transitions per cadence period, and each cadence pattern is assigned a unique value ranging from 1 to 128 corresponding to a value sent by an LE SIGNAL message.

72. The device according to claim 71, wherein the ring cadence table includes:
a ring cadence index selecting one of a plurality of 128 ring cadence patterns, said ring cadence index having an integer range between 1 and 128.

73. The device according to claim 72, wherein said ring cadence table includes:
a plurality of entries, a particular row of which is selectable by the ring cadence index, said ring cadence entry table having a row including a plurality of parameters for a given ring cadence pattern.

74. The device according to claim 71, wherein said ring cadence table includes:
a ring cadence value describing a ring cadence pattern.

75. The device according to claim 74, wherein said ring cadence value comprises an octet bit string having a range between 2 octets of bits and 28 octets of bits, a first octet of bits of which represents a length in bits of a duration of a given cadence, and each bit after the first octet represents about 50 milliseconds in time with a one value representing a ring and a zero value representing silence.

76. The device according to claim 71, wherein said ring cadence table includes:
a standard ring cadence value representing a ring cadence pattern for a standard ring, said standard ring cadence value comprising an octet bit string having a range between 2 octets of bits and 28 octets of bits, a first octet of bits of which represents a length in bits of a duration of a standard ring cadence, and each bit after the first octet represents about 50 milliseconds in time with a one value representing a ring and a zero value representing silence.

77. The device according to claim 71, wherein said ring cadence table includes:
a splash ring cadence value representing a splash ring cadence pattern for a splash ring, said splash ring cadence value comprising an octet bit string having a range between 2 octets of bits and 28 octets of bits, a first octet of bits of which represents a length in bits of a duration of a standard ring cadence, and each bit after the first octet represents about 50 milliseconds in time with a one value representing a ring and a zero value representing silence.

78. The device according to claim 1, wherein said third management information base table includes:
a tone table defining various tone operations.

79. The device according to claim 78, wherein said tone table includes:
a tone entry value selecting one of a plurality of different tone types, said tone entry value having an integer range between 1 and 49.

80. The device according to claim 79, wherein said plurality of different tone types includes a plurality of dual tone modulated frequency tones for zero through nine.

81. The device according to claim 79, wherein said plurality of different tone types includes a dual tone modulated frequency tone for a "*" character and a dual tone modulated frequency tone for a "#" character.

82. The device according to claim 79, wherein said plurality of different tone types includes a dual tone modulated frequency tone for a character "A", a dual tone modulated frequency tone for a character "B", a dual tone modulated frequency tone for a character "C", and a dual tone modulated frequency tone for a character "D".

83. The device according to claim 79, wherein said plurality of different tone types includes a busy tone.

84. The device according to claim 79, wherein said plurality of different tone types includes a confirmation tone.

85. The device according to claim 79, wherein said plurality of different tone types includes a dial tone.

86. The device according to claim 79, wherein said plurality of different tone types includes a message waiting tone.

87. The device according to claim 79, wherein said plurality of different tone types includes an off-hook-warning tone.

88. The device according to claim 79, wherein said plurality of different tone types includes a ring-back tone.

89. The device according to claim 79, wherein said plurality of different tone types includes a re-Order tone.

90. The device according to claim 79, wherein said plurality of different tone types includes a first call-waiting tone.

91. The device according to claim 90, wherein said plurality of different tone types includes a second call-waiting tone.

92. The device according to claim 91, wherein said plurality of different tone types includes a third call-waiting tone.

93. The device according to claim 92, wherein said plurality of different tone types includes a fourth call-waiting tone.

94. The device according to claim 79, wherein said plurality of different tone types includes an alerting signal tone.

95. The device according to claim 79, wherein said plurality of different tone types includes a test tone.

96. The device according to claim 79, wherein said plurality of different tone types includes a special dial tone.

97. The device according to claim 79, wherein said plurality of different tone types includes a special information tone.

98. The device according to claim 79, wherein said plurality of different tone types includes a release tone.

99. The device according to claim 79, wherein said plurality of different tone types includes a congestion tone.

100. The device according to claim 79, wherein said plurality of different tone types includes a user-defined tone.

101. The device according to claim 79, wherein said tone table further includes:
a tone type value having an integer range.

102. The device according to claim 79, wherein said tone table further includes:
a tone decibel level value having an integer range between about −60 decibels and about 4 decibels.

103. The device according to claim 79, wherein said tone table further includes:
a tone number of frequencies value having an integer range between 1 and 4;
a tone number of ON/OFF times value having an integer range between 1 and 4 and having a default value of 1;
a first tone frequency value specifying a first tone frequency and having an integer range between 0 and 4000 Hertz;
a second tone frequency value specifying a second tone frequency having an integer range between 0 and 4000 Hertz;
a third tone frequency value specifying a third tone frequency having an integer range between 0 and 4000 Hertz;

a fourth tone frequency value specifying a fourth tone frequency having an integer range between 0 and 4000 Hertz;

a first tone ON value establishing a first tone interval having an integer range between 0 and 5000 milliseconds;

a first tone OFF value establishing a first idle interval having an integer range between 0 and 5000 milliseconds;

a second tone ON value establishing a second tone interval having an integer range between 0 and 5000 milliseconds;

a second tone OFF value establishing a second idle interval having an integer range between 0 and 5000 milliseconds;

a third tone ON value establishing a third tone interval having an integer range between 0 and 5000 milliseconds;

a third tone OFF value establishing a third idle interval having an integer range between 0 and 5000 milliseconds;

a fourth tone ON value establishing a fourth tone interval having an integer range between 0 and 5000 milliseconds; and a fourth tone OFF value establishing a fourth idle interval having an integer range between 0 and 5000 milliseconds.

104. The device according to claim 103, wherein said tone table further comprises:

a tone frequency type having an integer range between 1 and 4 selecting one of four tone frequency types, including: (1) all-frequencies indicating all frequencies specified by the tone number of frequencies value are mixed to form a single tone, which single tone is then applied in sequence using a number of on/off times specified in the tone number of ON/OFF times value; (2) a single-frequency-sequence indicating all frequencies specified by the tone number of frequency value are applied in sequence using a corresponding frequency number on/off time. (3) a dual-frequency-sequence indicating two pairs of frequencies are mixed to form two sequenced tones, in which a first tone frequency specified by the first tone frequency value and a second tone frequency specified by the second tone frequency value are mixed to form a tone ONE that is applied using a value specified by the first tone ON value and a value specified by the first tone OFF value, and a third frequency specified by the third tone frequency value and a fourth frequency specified by the fourth tone frequency value are mixed to form a tone TWO that is applied using a value specified by the second tone ON value and a value specified by the second tone OFF value; and (4) an all-frequencies-modulated indicating that all frequencies specified by the tone number of frequencies value are modulated to form a single tone that is then applied in sequence using a number of on/off times specified in the tone number of ON/OFF times value; wherein said all-frequencies is a default value.

105. The device according to claim 104, wherein said tone table further includes:

a whole tone repeat count value defining a number of times to repeat a defined tone of ON/OFF sequences and having an integer range between about 0 milliseconds and about 5000 milliseconds.

106. The device according to claim 104, wherein said tone table further includes:

a tone steady value determining whether to repeat a last tone at an ON/OFF sequence continuously and having a value of 1 or 0.

107. A computer readable media having stored thereon programming instructions for a telephony device instructing the telephony device to accept a plurality of downloadable values that can be downloaded to the telephony device over an Internet Protocol network and stored in an accessible memory, wherein each of the plurality of values are defined as a management information base object or a management information base table that includes one or more management information base objects, said plurality of values including:

a first set of management information base objects, one set for each of the one or more telephone ports, said first set of management information base objects controlling a first set of operations of the telephony device, said first set of operations including hook flash operations, pulse dialing operations, jitter buffer size, debounce characteristics, transmitter gain and receiver gain;

a second set of management information base objects, a number of which are independent of a number of the one or more telephone ports, said second set of management information base objects controlling a second set of operations of the telephony device, said second set of operations including caller identification functionality;

a first management information base table controlling pulse signaling operations for the telephony device;

a second management information base table controlling ringing cadence operations for the telephony device; and a third management information base table controlling tone operations for the telephony device.

108. A method for operating a telephony device to account for variations in international standards for certain telephony operations, including hook flash functionality, pulse dialing operations, tone dialing operations, jitter buffer size, debounce characteristics, transmitter and receiver gain, caller identification functionality, pulse signaling operations, and ringing operations, said method comprising:

defining each of the plurality of values as a management information base object or a management information base table including a plurality of management information base objects;

receiving a plurality of downloadable values downloaded to the telephony device over an Internet Protocol network;

storing the plurality of downloadable values in a memory in the telephony device; and using the stored plurality of downloadable values to control operations of the telephony device, including hook flash functionality, pulse dialing operations, tone dialing operations, jitter buffer size, debounce characteristics, transmitter and receiver gain, caller identification functionality, pulse signaling operations, and ringing operations.

109. The method according to claim 108, wherein the plurality of downloadable values includes:

a first set of management information base objects, one set for each telephone port, said first set of management information base objects controlling a first set of operations of the telephony device, said first set of operations including hook flash operations, pulse dialing operations, jitter buffer size, debounce characteristics, transmitter gain and receiver gain;

a second set of management information base objects, a number of which are independent of a number the telephone ports, said second set of management information base objects controlling a second set of operations of the telephony device, said second set of operations including caller identification functionality;

a first management information base table controlling pulse signaling operations for the telephony device;

a second management information base table controlling ringing cadence operations for the telephony device; and a third management information base table controlling tone operations for the telephony device.

* * * * *